(12) United States Patent
Fujimoto et al.

(10) Patent No.: US 7,514,495 B2
(45) Date of Patent: Apr. 7, 2009

(54) ANTISTATIC AGENT FOR VINYL CHLORIDE-BASED RESINS, VINYL CHLORIDE-BASED RESIN COMPOSITION CONTAINING THE SAME, AND METHOD FOR MANUFACTURING THIS COMPOSITION

(75) Inventors: Tatsuya Fujimoto, Kamisu (JP); Ken Yahata, Kamisu (JP); Tadashi Amano, Kamisu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 338 days.

(21) Appl. No.: 11/430,622

(22) Filed: May 9, 2006

(65) Prior Publication Data
US 2006/0257660 A1    Nov. 16, 2006

(30) Foreign Application Priority Data
May 13, 2005    (JP)    .............................. 2005-141185

(51) Int. Cl.
*C08K 3/36*    (2006.01)
(52) U.S. Cl. ........................................ 524/493; 524/80

(58) Field of Classification Search .................. 524/493
See application file for complete search history.

(56) References Cited

FOREIGN PATENT DOCUMENTS

| EP | 0 444 326 | 9/1991 |
|---|---|---|
| GB | 1 139 226 | 1/1969 |

OTHER PUBLICATIONS

European Search Report from European Application No. EP 06290724, dated Sep. 13, 2006 (search completed Sep. 7, 2006).

*Primary Examiner*—Kriellion A Sanders
(74) *Attorney, Agent, or Firm*—Clark & Elbing LLP

(57) ABSTRACT

The present invention provides an antistatic agent for vinyl chloride-based resins which can impart superior antistatic properties to the vinyl chloride-based resin, and which can thereby solve various problems arising from charging of the vinyl chloride-based resin with static electricity, a vinyl chloride-based resin composition containing this antistatic agent, and a method for manufacturing this composition. The present invention provides an antistatic agent for vinyl chloride-based resins which consists of silica particles containing at least 99.0% by mass of $SiO_2$ and 0.00005% 80.5 ppm by mass or less of sodium, and which has such a particle size distribution that at least 98% by mass of the silica particles is occupied by the particles having a particle diameter in the range from 30 to 1,000 nm.

4 Claims, No Drawings

ANTISTATIC AGENT FOR VINYL CHLORIDE-BASED RESINS, VINYL CHLORIDE-BASED RESIN COMPOSITION CONTAINING THE SAME, AND METHOD FOR MANUFACTURING THIS COMPOSITION

CROSS REFERENCE TO RELATED APPLICATION

This application claims priority under 35 U.S.C. § 119(a) from Japanese Patent Application No. 2005-141185, filed on May 13, 2005, the disclosure of which is incorporated herein by reference.

BACKGROUND OF THE INVENTION

The present invention relates to an antistatic agent for vinyl chloride-based resins, which is superior in terms of antistatic properties, a vinyl chloride-based resin composition containing this antistatic agent, and a method for manufacturing this antistatic composition.

Vinyl chloride-based resins are superior in terms of moldability, and can be utilized in various types of molding methods. Furthermore, the molded articles obtained from such resins are superior in terms of flame retarding properties, weatherability, water resistance, chemical resistance and the like, and can be used in a broad range of applications, e.g., construction materials such as pipes, couplings, corrugated boards, films and sheets, window sashes and the like.

However, the surface resistivity of vinyl chloride-based resins is so high as to be $10^{13}$ to $10^{14}$ ohms, so that the surfaces of such resins tend to become charged with static electricity when rubbed; furthermore, once these resins have been charged, the charges tend not to leak from the surface, so that various problems arise. Examples of such problems include the following: for instance, in cases where vinyl chloride-based resins are used as base materials, the flowability of the resin may decrease and aggregate form blocks may be formed so that problems in conveying work such as clogging of pipes and bridging of hoppers occur. Furthermore, problems in molding and working may occur, such as obstruction of the uniform mixing of the overall composition containing such resins, and there may also be problems in terms of safety such as the triggering of ignition or explosion, and problems in terms of external appearance such as deterioration of the external appearance of the product due to the adsorption of dirt and dust.

Furthermore, when a vinyl chloride-based resin has been charged with static electricity, the bulk density drops, so that there are also problems from the standpoint of metering errors in terms of weight when a specified volume is metered.

Usually, a method in which antistatic agents are added to a vinyl chloride-based resin is used in order to solve such problems caused by static electricity in vinyl chloride-based resins. In most cases, surfactants are used as the antistatic agent.

For example, an antistatic vinyl chloride-based resin composition in which an anionic and/or nonionic surfactant, a perchlorate and a polyethylene oxide are blended with a vinyl chloride-based resin has been proposed in Japanese Patent Application Laid-Open No. 6-179789.

SUMMARY OF THE INVENTION

However, in the antistatic method for vinyl chloride-based resins described in Japanese Patent Application Laid-Open No. 6-179789, a large amount of additive must be added to the vinyl chloride-based resin; accordingly, the work is complicated and the cost is increased, so that this method cannot be characterized as an economical method. In recent years, furthermore, restrictions have been imposed on the amounts of nonionic surfactants contained in waste water; accordingly, it is difficult to use methods that add nonionic surfactants.

It is an object of the present invention to provide an antistatic agent for vinyl chloride-based resins which can impart superior antistatic properties to vinyl chloride-based resins, and which can thereby solve various problems arising from charging of vinyl chloride-based resins with static electricity, a vinyl chloride-based resin composition containing this antistatic agent, and a method for manufacturing this antistatic resin composition.

In order to achieve the above-mentioned object, the present invention provides an antistatic agent for vinyl chloride-based resins which is characterized in that this agent consists of a silica powder containing 99.0% by mass or more of $SiO_2$ and not exceeding 0.00005% (0.5 ppm) by mass of sodium, and having a particle size distribution such that 98% by mass or more of the silica particles have a particle diameter of 30 to 1,000 nm.

Furthermore, the present invention provides a vinyl chloride-based resin composition which is characterized in that this composition is formed by blending 0.001 to 0.1 mass part of the above-mentioned antistatic agent for vinyl chloride-based resins with 100 mass parts of a vinyl chloride-based resin.

Moreover, the present invention provides a method for manufacturing a vinyl chloride-based resin composition characterized in that 0.001 to 0.1 mass part of the above-mentioned antistatic agent is added to 100 mass parts of a vinyl chloride-based resin in the form of a slurry or dehydrated cakes following the completion of the polymerization of vinyl chloride monomer, or to a dried product of the same.

The antistatic agent for vinyl chloride-based resins provided by the present invention can impart a vinyl chloride-based resin with superior antistatic properties without affecting the initial coloring characteristics, flowability, thermal stability and others.

DESCRIPTION OF THE PREFERRED EMBODIMENTS

As was described above, the antistatic agent for vinyl chloride-based resins provided by the present invention consists of silica particles containing 99.0% by mass or more of $SiO_2$ and 0.00005% by mass or less of sodium, and 98% by mass or more of these silica particles have a particle size distribution of 30 to 1,000 nm.

The $SiO_2$ that constitutes a component of the antistatic agent for vinyl chloride-based resins may be prepared by any appropriate manufacturing method; however, high-purity silica obtained by a dry process is especially desirable. Among the dry processes, pyrolytic decomposition of silicon tetrachloride is especially desirable, since high-purity silica can be obtained by this method. For example, silicon tetrachloride pyrolytic decomposition methods that can be used include a method in which silicon tetrachloride is gasified as a saturated gas by passing hydrogen and oxygen through silicon tetrachloride inside a vessel maintained at a constant temperature, using an apparatus in which a single vessel containing this silicon tetrachloride has two or more inlet ports for hydrogen, oxygen and the like, and an outlet port for silicon tetrachloride, and this silicon tetrachloride, hydrogen, oxygen and others are mixed at a fixed ratio and burnt. In this method, the reaction proceeds at a temperature of 1,000 to 1,200° C., and fine particles of high-purity silica are obtained after the hydrochloric acid and the like produced as by-products are removed.

In the antistatic agent for vinyl chloride-based resins provided by the present invention, it is necessary that the $SiO_2$ content be 99.0% by mass or greater. If the $SiO_2$ content is lower than 99.0% by mass, no sufficient antistatic effect can be obtained. A desirable range for the $SiO_2$ content is 99.0 to 99.99% by mass, and this range is still more preferably 99.50 to 99.90% by mass.

Furthermore, in the antistatic agent for vinyl chloride-based resins provided by the present invention, it is necessary that the sodium content be 0.00005% (0.5 ppm) by mass or lower. If the sodium content exceeds 0.00005% by mass, there can be a problem that the initial coloring characteristics and thermal stability during the molding and working of the vinyl chloride-based resin will deteriorate. An actually possible range for the sodium content is from 0.000001 to 0.00005% by mass, and a more desirable upper limit of the sodium content is 0.00004% (0.4 ppm) by mass. The sodium content can be determined by the elementaryl analysis using the method of fluorescent X-ray analysis or the like.

In the antistatic agent for vinyl chloride-based resins provided by the present invention, it is necessary that 98% by mass or more of the silica particles have a particle size distribution of 30 to 1,000 nm. If the particle diameter is smaller than 30 nm, for example, there can be a trouble that, in cases where the antistatic agent for vinyl chloride-based resins provided by the present invention is added to a polymerization slurry, this additive will be lost to the outside of the system together with the water in the dehydration process. In contrast, in cases where the antistatic agent for vinyl chloride-based resins provided by the present invention is added to the dehydrated cakes, there may be instances in which this additive is scattered away so that the problem of a decrease in the dispersibility in the vinyl chloride-based resin occurs. On the other hand, if the particle diameter exceeds 1,000 nm, the uniformity of dispersion in the vinyl chloride-based resin decreases, the exhibition of an antistatic effect decreases, and this may lead to the occurrence of "fisheyes."

In the antistatic agent for vinyl chloride-based resins provided by the present invention, it is necessary that 98% by mass or more of the silica particles have a particle size distribution of 30 to 1,000 nm; however, it is desirable that silica particles having a particle diameter smaller than 30 nm and silica particles having a particle diameter exceeding 1,000 nm respectively constitute 1% by mass or smaller of the total silica particles. Furthermore, it is desirable that all of the silica particles have a particle size distribution of 30 to 1,000 nm, and it is especially desirable that these silica particles have a particle size distribution of 50 to 900 nm.

Furthermore, in the antistatic agent for vinyl chloride-based resins provided by the present invention, it is desirable that the average particle diameter of the silica particles be in the range of 100 to 600 nm. If the average particle diameter is smaller than 100 nm, for example, there can be a trouble that in cases where the antistatic agent for vinyl chloride-based resins provided by the present invention is added to a polymerization slurry, this additive will be discharged to the outside of the system together with the water in the dehydration process; furthermore, in cases where the antistatic agent for vinyl chloride-based resins provided by the present invention is added to the dehydrated cakes, there may be instances in which this additive is scattered away so that the problem of a drop in the dispersibility in the vinyl chloride-based resin occurs. On the other hand, if the average particle diameter exceeds 600 nm, the uniformity of dispersion in the vinyl chloride-based resin decreases, the exhibition of an antistatic effect drops, and this may cause the "fish eye" phenomenon. It is especially desirable that the average particle diameter of the silica particles be in the range of 200 to 400 nm.

The measurement of the particle size distribution and average particle diameter was accomplished by placing 0.04 g of the antistatic agent and 80 ml of methanol in a 200-ml beaker, then dispersing this mixture for 3 minutes using an ultrasonic homogenizer (trade name US-300T manufactured by Nippon Seiki Seisakusho), allowing the mixture to stand for 1 hour, measuring the particle size distribution using a photon correlation type particle size distribution analyzer (trade name ELS-8000 manufactured by Otsuka Electronic), determining the measured values of the average particle diameter, and taking the average of the measured values obtained in 10 measurements as the average particle diameter.

The antistatic agent for vinyl chloride-based resins provided by the present invention can be used "as is" in the form of a silica powder, or can be used by mixing the agent with a vinyl chloride-based resin in a state in which the agent is dispersed in a small volume of pure water.

Furthermore, this agent can also be used as a coating type antistatic agent by causing a preparation obtained by dispersing the agent in an appropriate solvent, e.g., pure water, methanol or the like, to deposit onto the surface of a vinyl chloride-based resin by spraying this preparation onto the resin. In this case, in consideration of the problem of environmental pollution, pure water is desirable as the dispersing solvent.

The antistatic agent for vinyl chloride-based resins is superior in terms of compatibility with vinyl chloride-based resins. This agent does not bloom after molding; the method of use is easy, and the agent does not cause any loss of the performance of the vinyl chloride-based resins.

The vinyl chloride-based resin composition of the present invention is formed by blending 0.001 to 0.1 mass part of the above-mentioned antistatic agent for vinyl chloride-based resins with 100 mass parts of a vinyl chloride-based resin. If the amount of the agent added to the resin is smaller than 0.001 mass part, it becomes difficult to exhibit an antistatic effect; on the other hand, if this amount exceeds 0.1 mass part, not only is the cost increased, but problems such as deterioration in the clarity when the vinyl chloride-based resin is molded and worked arise. The antistatic agent for vinyl chloride-based resins is preferably blended in an amount ranging from 0.005 to 0.05 mass part, and is still more preferably blended in an amount ranging from 0.005 to 0.03 mass part.

The vinyl chloride-based resin composition of the present invention is manufactured as follows: namely, the above-mentioned antistatic agent for vinyl chloride-based resins is added at a proportion of 0.001 to 0.1 mass part (preferably 0.002 to 0.04 mass part) per 100 mass parts of vinyl chloride-based resin contained in an aqueous slurry or dehydrated cakes following completion of the polymerization of vinyl chloride monomer, or in a dried product of the same, thus producing the vinyl chloride-based resin composition of the present invention, which tends not to be charged with static electricity, and which shows no drop in bulk density or flowability.

When the above-mentioned antistatic agent for vinyl chloride-based resins is added to the vinyl chloride-based resin, it is especially desirable from the standpoint of uniform dispersibility that this agent be added when the vinyl chloride-based resin is in the state of a slurry or dehydrated cakes.

The vinyl chloride-based resin that constitutes the vinyl chloride-based resin composition of the present invention, i.e.

the vinyl chloride-based resin that is the object of addition of the antistatic agent for vinyl chloride-based resins, is a polyvinyl chloride or a copolymer consisting of 50% by mass or more of vinyl chloride and one or more of comonomers copolymerizable with vinyl chloride. This vinyl chloride-based resin is obtained by polymerization in an aqueous medium.

Examples of the comonomers copolymerizable with vinyl chloride include vinyl esters such as vinyl acetate, vinyl propionate and the like; unsaturated acids such as acrylic acid, methacrylic acid, itaconic acid and the like and alkyl esters thereof; olefins such as ethylene, propylene, butene and the like; maleic acid, fumaric acid and anhydrides thereof and esters of these acids; acrylonitrile; styrene; vinylidene chloride; vinyl ethers such as methyl vinyl ether, ethyl vinyl ether, octyl vinyl ether and the like; aromatic vinyl compounds such as styrene and the like. These compounds may be used singly, or may be used as combinations of two or more compounds.

Furthermore, the vinyl chloride-based resin used in the present invention may be used regardless of the average degree of polymerization.

In cases where the vinyl chloride-based resin is manufactured, dispersion aids and polymerization initiators conventionally used in the manufacture of vinyl chloride-based resins may be used.

Examples of the dispersion aids that can be used include water-soluble cellulose ethers such as methylcellulose, hydroxyethylcellulose, hydroxypropylcellulose, hydroxypropylmethylcellulose and the like; water-soluble partially saponified polyvinyl alchohols; acrylic acid polymers; water-soluble polymers such as gelatin and the like; oil-soluble emulsifying agents such as sorbitan monolaurate, sorbitan trioleate, glycerol tristearate, ethylene oxide-propylene oxide block copolymers and the like; and water-soluble emulsifying agents such as polyoxyethylene sorbitan monolaurate, polyoxyethylene glycerol oleate, sodium laurate and the like. These compounds may be used singly or in combinations of two or more compounds.

Furthermore, there are no particular limitations on the above-mentioned polymerization initiator; initiators used in the manufacture of conventional vinyl chloride-based resins may be used. Examples of such compounds include peroxycarbonate compounds such as diisopropyl peroxydicarbonate, di-2-ethylhexyl peroxydicarbonate, diethoxyethyl peroxydicarbonate and the like; peroxy ester compounds such as tert-butyl peroxypivalate, tert-hexyl peroxypivalate, tert-butyl peroxyneodecanoate, α-cumyl peroxyneodecanoate and the like; peroxide compounds such as acetylcyclohexylsulfonyl peroxide, 2,4,4-trimethylpentyl-2-peroxyphenoxyacetate, 3,5,5-trimethylhexanoyl peroxide and the like; azo compounds such as azobis-2,4-dimethylvaleronitrile, azobis(4-methoxy-2,4-dimethylvaleronitrile) and the like; and potassium persulfate, ammonium persulfate, hydrogen peroxide and the like. These compounds may be used singly, or in combinations of two or more compounds.

Furthermore, other conditions in polymerization, e.g., the method used to place the aqueous medium, vinyl chloride or monomer mixture containing vinyl chloride, dispersion aid, polymerization initiator and the like in the polymerization reactor, proportions in which these components are mixed, the polymerization temperature and the like, may be the same as in conventional methods.

If necessary, polymerization degree-controlling agents, i.e., chain transfer agents, gelation modifying agents and the like that are ordinarily used in the manufacture of vinyl chloride-based resins can be used in the manufacture of this vinyl chloride-based resin. Furthermore, oxidation inhibitors can be added to the polymerization system prior to the starting of polymerization, during polymerization or after completion of polymerization for the purpose of controlling the polymerization reaction, preventing deterioration of the product polymer or the like.

If necessary, furthermore, auxiliary materials used in vinyl chloride-based resins, such as plasticizers, stabilizers, fillers, flame retardants, coloring agents and the like may be appropriately mixed with the vinyl chloride-based resin composition of the present invention in addition to vinyl chloride-based resins and the antistatic agent for vinyl chloride-based resins provided by the present invention.

In the following, the present invention will be described in more particulars by way of the embodiments of the invention and comparative examples; but, the scope of the present invention is never limited by or to these embodiments in any way.

EXAMPLE 1

Into a stainless steel jacketed polymerization reactor having a capacity of 2.1 m$^3$ and equipped with a flat-plate baffle agitator were introduced 350 g of a partially saponified polyvinyl alcohol as dissolved in 820 kg of deionized water. After deaeration of the solution under agitation down to a pressure of 50 mmHg, 745 kg of vinyl chloride monomer were introduced into the reactor under agitation and then 90 g of 2-ethylhexylperoxy dicarbonate and 450 g of tert-butylperoxy neodecanoate as the polymerization initiators were added to the reactor by pressurization with a pump. Concurrently with the introduction of the initiators, heating of the polymerization mixture was started to conduct polymerization of the vinyl chloride monomer, which was continued by keeping the polymerization temperature at 56° C. until the pressure inside the reactor had reached 690 kPa.

Completion of the polymerization was followed by recovery of the unreacted monomer and discharging of the aqueous polymerizate slurry out of the reactor to collect the slurry in a slurry tank. Thereafter, the polymerizate slurry was admixed with 67 g of a silica powder in the form of the powder as such as an antistatic agent, of which the contents of silicon dioxide and sodium as well as the particle size distribution and average particle diameter were as shown in Table 1. This silica powder was a product obtained by pyrolytic decomposition of silicon tetrachloride. The above-mentioned polymerizate slurry contained 670 kg of the polyvinyl chloride resin as dried.

After addition of the antistatic agent, drying was performed by means of a fluidization drier until the water content of the polymer had reached 0.5% or lower, thus producing a vinyl chloride-based resin composition. The composition proportions of polyvinyl chloride and the above-mentioned antistatic agent in this vinyl chloride-based resin composition were as shown in Table 1. The thus obtained vinyl chloride-based resin was subjected to the measurement of the average degree of polymerization by the method of JIS K6721 to obtain a value of 1030. Furthermore, the particle size distribution and average particle diameter of the silica powder were determined in the following way: first, 0.04 g of the silica powder and 80 ml of methanol were taken in a 200 ml beaker. Thereafter, the silica powder was dispersed in methanol by using an ultrasonic homogenizer (Model US-300T, manufactured by Nippon Seiki Seisakusho) for 3 minutes; then, after the sample was kept standing for 1 hour, the particle size distribution was measured and the value of the average particle diameter was determined using a photon correlation type particle size distribution analyzer (Model ELS-8000, manufactured by Otsuka Denshi), and the average value of the measured values obtained in 10 measurements was taken as the average particle diameter (these values were determined in the same manner in the following Examples and Comparative Examples).

EXAMPLE 2

Polymerization of vinyl chloride monomer was conducted in the same manner as in Example 1. Following the completion of the polymerization, the unreacted monomer was recovered from the polymerization reactor, and the polymerizate slurry produced was discharged out of the polymerization reactor and was dehydrated by means of a centrifugal separator to produce dehydrated cakes. The amount of this dehydrated cake was 670 kg as a dried polyvinyl chloride resin.

A vinyl chloride-based resin composition was prepared by the same method as in Example 1, except for the fact that 201 g of the same silica powder as that used in Example 1 were added to the dehydrated cakes. The compounding proportions of polyvinyl chloride and the above-mentioned silica powder in this vinyl chloride-based resin composition was as shown in Table 1. Furthermore, the polyvinyl chloride thus obtained was subjected to the measurement of the polymerization degree by the method of JIS K6721 to obtain a value of 1,030.

EXAMPLE 3

Into a jacketed stainless steel polymerization reactor having a capacity of 2.1 m$^3$ and equipped with a flat-plate baffle agitator were introduced 300 g of a partially saponified polyvinyl alcohol as dissolved in 890 kg of deionized water. The interior of this polymerization reactor was deaerated down to a pressure of 50 mmHg, and then 670 kg of vinyl chloride monomer were introduced into the reactor.

Next, while the interior of the above-mentioned polymerization reactor was under agitation, 350 g of tert-butylperoxy neodecanoate were introduced under pressure to the reactor as a polymerization initiator by means of a pump. Furthermore, elevation of the temperature was started simultaneously with this introduction under pressure, and polymerization of the vinyl chloride monomer was initiated. During polymerization, the polymerization temperature was maintained at 63° C., and polymerization was terminated at a moment when the pressure inside the polymerization reactor had reached 690 kPa.

Following completion of the polymerization, unreacted vinyl chloride monomer was recovered from the polymerization reactor, and the polymer produced was discharged out of the polymerization reactor in the form of an aqueous slurry, which was dehydrated by means of a centrifugal separator to produce dehydrated cakes. The amount of the dehydrated cakes was 600 kg as a dried polyvinyl chloride resin.

A vinyl chloride-based resin composition was prepared by the same method as in Example 1, except for the fact that 30 g of a silica powder as the antistatic agent of which the contents of silicon dioxide and sodium were as shown in Table 1, having a particle size distribution and average particle diameter shown also in the same table, were added in the powdered form as such to the dehydrated cakes. The silica powder was a product obtained by the pyrolytic decomposition of silicon tetrachloride. The compounding proportion of the polyvinyl chloride resin and the above-mentioned silica powder in this vinyl chloride-based resin composition was as shown in Table 1. The polyvinyl chloride resin as obtained was subjected to the measurement of the degree of polymerization by the method specified in JIS K6721 to give a value of 700.

EXAMPLE 4

Into a jacketed stainless steel polymerization reactor having a capacity of 2.1 m$^3$ and equipped with a flat-plate baffle agitator, 500 g of a partially saponified polyvinyl alcohol as dissolved in 960 kg of deionized water were introduced. The interior of this polymerization reactor was deaerated down to a pressure of 50 mmHg, and then 670 kg of vinyl chloride monomer were introduced to the reactor.

Next, while the content of the above-mentioned polymerization reactor was under agitation, 350 g of tert-butylperoxy neodecanoate were introduced under pressure as a polymerization initiator by means of a pump. Elevation of the temperature was started simultaneously with introduction of the initiator under pressure, and polymerization of the vinyl chloride monomer was initiated. During proceeding of the polymerization, the polymerization temperature was maintained at 51° C., and polymerization was terminated at a moment when the pressure inside the polymerization reactor had reached 690 kPa.

After completion of the polymerization reaction, the unreacted monomer was recovered from the polymerization reactor and the polymer produced was discharged out of the polymerization reactor in the form of an aqueous slurry, which was dehydrated by means of a centrifugal separator to produce dehydrated cakes. The amount of the dehydrated cakes was 600 kg as a dried polyvinyl chloride resin.

A vinyl chloride-based resin composition was prepared by the same method as in Example 1, except for the fact that 30 g of a silica powder, of which the contents of silicon dioxide and sodium were as shown in Table 1, and having a particle size distribution and average particle diameter shown also in the same table, were added in the powdered form to this dehydrated cakes. This silica powder as the antistatic agent for vinyl chloride-based resins, was a product obtained by the pyrolytic decomposition of silicon tetrachloride. The compoumding proportion of the polyvinyl chloride and the abovementioned silica powder in this vinyl chloride-based resin composition was as shown in Table 1. The polyvinyl chloride as obtained was subjected to the measurement of the degree of polymerization by the method specified in JIS K6721 to give a value of 1,300.

COMPARATIVE EXAMPLE 1

A vinyl chloride-based resin composition was prepared in the same manner as in Example 1, except for the entire omission of the silica powder as an antistatic agent for vinyl chloride-based resins in the formulation of the composition in Example 1. The polyvinyl chloride resin as obtained was subjected to the measurement of the degree of polymerization by the method specified in JIS K6721 to give a value of 1030.

COMPARATIVE EXAMPLE 2

Polymerization of vinyl chloride monomer was conducted in the same manner as in Example 1 and a vinyl chloride-based resin composition was prepared in the same manner as in Example 1 except that the polyvinyl chloride resin obtained above was blended with 67 g of a silica powder having contents of silicon dioxide and sodium and having a particle size distribution and average particle diameter as shown in Table 1. The polyvinyl chloride resin obtained above had a degree of polymerization of 1030 as determined by the method specified in JIS K6721. The silica powder used above was a product obtained by the pyrolytic decomposition of silicon tetrachloride.

COMPARATIVE EXAMPLE 3

A vinyl chloride-based resin was subjected to the evaluation tests in the same manner as in Example 3 except that no silica powder was blended with the polyvinyl chloride resin, which was obtained by polymerizing vinyl chloride monomer in the same manner as in Example 3. The polyvinyl chloride resin thus obtained had a degree of polymerization of 700 as determined by the method specified in JIS K6721.

COMPARATIVE EXAMPLE 4

A vinyl chloride-based resin composition was prepared by the same method as in Example 4, except that no antistatic agent was added in the polymerization performed in Example 4. The polyvinyl chloride resin was subjected to the measurement of the degree of polymerization by the method specified in JIS K6721 to give a value of 1300.

COMPARATIVE EXAMPLE 5

Polymerization of vinyl chloride monomer was conducted in the same manner as in Example 1 and a polyvinyl chloride-based resin composition was prepared also in the same manner except that 67 g of the silica powder added to the resin had contents of silicon dioxide and sodium and a particle size distribution and average particle diameter as shown in Table 1. The silica powder employed here was a product obtained by pyrolytic decomposition of silicon tetrachloride and had such a particle size distribution that particles having a diameter exceeding 1000 nm occupied 10% by mass of the powder. The polyvinyl chloride resin as polymerized had a degree of polymerization of 1030 as determined by the method specified in JIS K6721. The polyvinyl chloride-based composition was subjected to the evaluation tests of various properties in the same manner as in Example 1 to give the results shown in Table 1.

The vinyl chloride-based resin compositions prepared in Examples 1 to 4 and Comparative Examples 1 to 5 were each subjected to the evaluation tests for the electrostatic chargeability, initial coloring, flowability, and number of fisheyes by the testing procedures described below. The results obtained by these evaluation tests are summarized in Table 1.

Following are descriptions of the testing procedures for the evaluation of various properties of the inventive and comparative vinyl chloride-based resin compositions, of which the results are summarized in Table 1.

Electrostatic chargeability: The vinyl chloride-based resin composition was subjected to the measurement of the bulk density by the method specified in JIS K6721. After being kept standing for 24 hours in a thermo-humidistat of 30% relative humidity at 10° C., a 1000 g portion of the resin composition was taken in a vessel and vigorously agitated for 5 minutes on a machine (Model Kenmix Aikopro KM250, manufactured by Aikosha Seisakusho) and again subjected to the measurement of the bulk density to record a usually decreased value. The difference between these two values if the bulk density could be taken as indicative of the electrostatic chargeability.

Initial coloring: A 100 parts by mass portion of the resin composition under testing was compounded with 0.3 part by mass of methylmercapto reverse ester (KM-55, a product by Katsuta Kako Co.), 0.5 part by mass of calcium stearate (a product by Nippon Yushi Co.) and 0.3 part by mass of a polyethylene-based lubricant (HIWAX 220 MP, a product by Mitsui Petrochemical Co.) and kneaded on a two-roller mill at 170° C. for 5 minutes followed by molding into a 0.8 mm thick sheet in a metal mold at 170° C. under a molding pressure of 70 kgf/cm$^2$. This resin sheet was cut into square pieces which were put one on the other in the 4 cm by 4 cm by 5 mm (depth) cavity of a metal mold and compression-molded into a plate specimen at 170° C. under a molding pressure of 65-70 kgf/cm$^2$ to give a test specimen. This test specimen was subjected to the measurement of coloring for the values of L, a and b by using a photoelectric colorimeter (manufactured by Nipponn Denshoku Kogyo Co.).

Flowability Test: The sheets obtained in the above-mentioned test of initial coloring characteristics weighing 2.5 g were finely cut into narrow strips, and the flowability of this sample was determined at 190° C. under a load of 100 kg/cm$^2$ using a Koka-type flow tester (manufactured by Shimadzu Seisakusho).

Test for Number of Fisheyes: A 100 mass parts portion of the vinyl chloride-based resin composition obtained was nixed in a beaker with 0.1 mass part of titanium dioxide (manufactured by Hayashi Jun'yaku), 0.5 mass part of tribasic lead sulfate (manufactured by Nitto Kasei), 0.7 mass part of barium stearate (manufactured by Nitto Kasei), 2.5 mass parts of lead stearate (manufactured by Nitto Kasei) and 0.035 mass part of carbon (manufactured by Tokai Denkyoku) and, after kneading for 5 minutes on a two-roller mill at 165° C., the resin compound was shaped into a sheet of 150 cm width.

The number of fisheyes was visually counted for a 10 cm by 10 cm area of the sheet thus obtained.

TABLE 1

|  | Example 1 | Example 2 | Example 3 | Example 4 | Comparative Example 1 | Comparative Example 2 | Comparative Example 3 | Comparative Example 4 | Comparative Example 5 |
| --- | --- | --- | --- | --- | --- | --- | --- | --- | --- |
| Vinyl chloride resin | | | | | | | | | |
| Amount taken, parts by mass | 100 | 100 | 100 | 100 | 100 | 100 | 100 | 100 | 100 |
| Polymerization degree | 1030 | 1030 | 700 | 1300 | 1030 | 1030 | 700 | 1300 | 1030 |
| Silica powder | | | | | | | | | |
| Content of silica, % by mass | 99.9 | 99.9 | 99.5 | 99.9 | — | 90 | — | — | 99.9 |
| Content of sodium, ppm by mass | 0.4 | 0.4 | 0.3 | <0.1 | — | 2 | — | — | <0.1 |
| Particle size distribution, nm | 80-900 | 80-900 | 100-900 | 100-900 | — | 100-900 | — | — | 20-1200 |
| Average particle diameter, nm | 250 | 250 | 280 | 265 | — | 280 | — | — | 780 |
| Amount added, parts by mass | 0.01 | 0.03 | 0.005 | 0.01 | 0 | 0.01 | 0 | 0 | 0.01 |

TABLE 1-continued

|  |  | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| Charging test | | | | | | | | | | |
| Bulk density, g/ml | before agitation | 0.568 | 0.570 | 0.567 | 0.495 | 0.565 | 0.565 | 0.565 | 0.495 | 0.565 |
|  | after agitation | 0.530 | 0.552 | 0.529 | 0.450 | 0.508 | 0.517 | 0.504 | 0.432 | 0.516 |
|  | difference | 0.038 | 0.018 | 0.038 | 0.045 | 0.057 | 0.048 | 0.061 | 0.063 | 0.049 |
| Initial coloring | | | | | | | | | | |
| | L | 62.88 | 62.19 | 63.83 | 63.28 | 62.63 | 59.85 | 63.95 | 63.26 | 60.22 |
| | a | 0.94 | 0.98 | 0.45 | −1.05 | 1.01 | 0.95 | 0.44 | −1.07 | 1.01 |
| | b | 18.87 | 18.83 | 16.87 | 17.00 | 18.89 | 22.21 | 16.89 | 17.02 | 19.02 |
| Flowability × $10^{-3}$ ml/s | | 2.16 | 2.24 | 3.46 | 2.06 | 2.14 | 2.10 | 3.42 | 2.04 | 2.13 |
| Fish-eyes, pieces | | 0 | 0 | 0 | 0 | 0 | 0 | 0 | 0 | 23 |

Following are summarizing remarks on the results of the evaluation tests.

Evaluation of Test of Initial Coloring Characteristics

With regard to the values of L, a and b of the initial coloring characteristics, Examples 1 and 2 showed almost no difference in the initial coloring from Comparative Example 1. Likewise, Example 3 showed no deterioration in the initial coloring as compared with Comparative Example 3.

In Example 4 and Comparative Example 4 as well, the antistatic agent showed no influences on the initial coloring.

Comparative Example 2 showed a decrease in the L value (a decrease in clarity) and an increase of the b value (increased yellowing) as compared with Comparative Example 1.

As compared with Comparative Example 1, Comparative Example 5 showed an effect on the L value and b value, and an increase in the fisheye count, as a result of the use of an antistatic agent with a large average particle diameter.

With regard to the particle size distribution:

The antistatic agent used in Example 1 totally had a particle size distribution range of 80 to 900 nm.

The antistatic agent used in Example 2 totally had a particle size distribution range of 80 to 900 nm.

All of the antistatic agent used in Example 3 was in a particle size distribution range of 100 to 900 nm.

The antistatic agent used in Example 4 totally had a particle size distribution range of 100 to 900 nm.

The antistatic agent used in Comparative Example 2 totally had a particle size distribution range of 100 to 900 nm.

It can be seen from the results in Table 1 that the vinyl chloride-based resin compositions of Comparative Examples 1 through 5 were all easily charged with static electricity. In contrast, it is noted that the vinyl chloride-based resin compositions of Examples 1 through 4, i.e., vinyl chloride-based resin compositions containing the antistatic agent according to the present invention, had superior antistatic performance without deterioration in the initial coloring characteristics or flowability, and without occurrence of fisheyes.

What is claimed is:

1. A method for increasing the antistatic performance of a vinyl chloride-based resin powder which comprises the step of: uniformly blending the vinyl chloride-based resin powder with a silica powder having such a particle size distribution that silica particles having a particle diameter in the range from 30 nm to 1000 nm occupy at least 98% by mass of the silica powder, of which the content of silicon dioxide is at least 99.0% by mass and the content of sodium does not exceed 0.5 ppm by mass.

2. The method as claimed in claim 1 wherein the blending amount of the silica powder is in the range from 0.001 to 0.1 part by mass per 100 parts by mass of the vinyl chloride-based resin powder.

3. The method as claimed in claim 1 wherein the resin powder with which the silica powder is blended is in the form of (i) an aqueous slurry, (ii) a cake obtained by dehydration of the aqueous slurry, or (iii) a dry powder obtained by drying the dehydrated cake.

4. A vinyl chloride-based resin powder composition having increased antistatic performance, which is a uniform blend consisting of 100 parts by mass of a vinyl chloride-based resin powder with from 0.001 to 0.1 part by mass of a silica powder having such a particle size distribution that silica particles having a particle diameter in the range from 30 nm to 1000 nm occupy at least 98% by mass of the silica powder, of which the content of silicon dioxide is at least 99.0% by mass and the content of sodium does not exceed 0.5 ppm by mass.

\* \* \* \* \*

UNITED STATES PATENT AND TRADEMARK OFFICE
CERTIFICATE OF CORRECTION

| | |
|---|---|
| PATENT NO. | : 7,514,495 B2 |
| APPLICATION NO. | : 11/430622 |
| DATED | : April 7, 2009 |
| INVENTOR(S) | : Fujimoto et al. |

It is certified that error appears in the above-identified patent and that said Letters Patent is hereby corrected as shown below:

On the Title Page, item (75), after Inventors, replace "Kamisu" with --Kamisu-shi--.

Column 5, Line 30, replace "alchohols" with --alcohols--.

Column 8, Line 40-41, replace "compoumding" with --compounding--.

Column 10, Line 9, replace "Aikopro" with --Aiko Pro--;

Line 31, replace "Nipponn" with --Nippon--; and

Line 40, replace "nixed" with --mixed--.

Signed and Sealed this
Ninth Day of August, 2011

David J. Kappos
*Director of the United States Patent and Trademark Office*